June 3, 1952 W. E. FARMER 2,599,241
LIGHTER THAN AIR AIRCRAFT WITH HEATING
MEANS FOR THE GAS BAGS THEREOF
Filed July 11, 1950 3 Sheets-Sheet 1
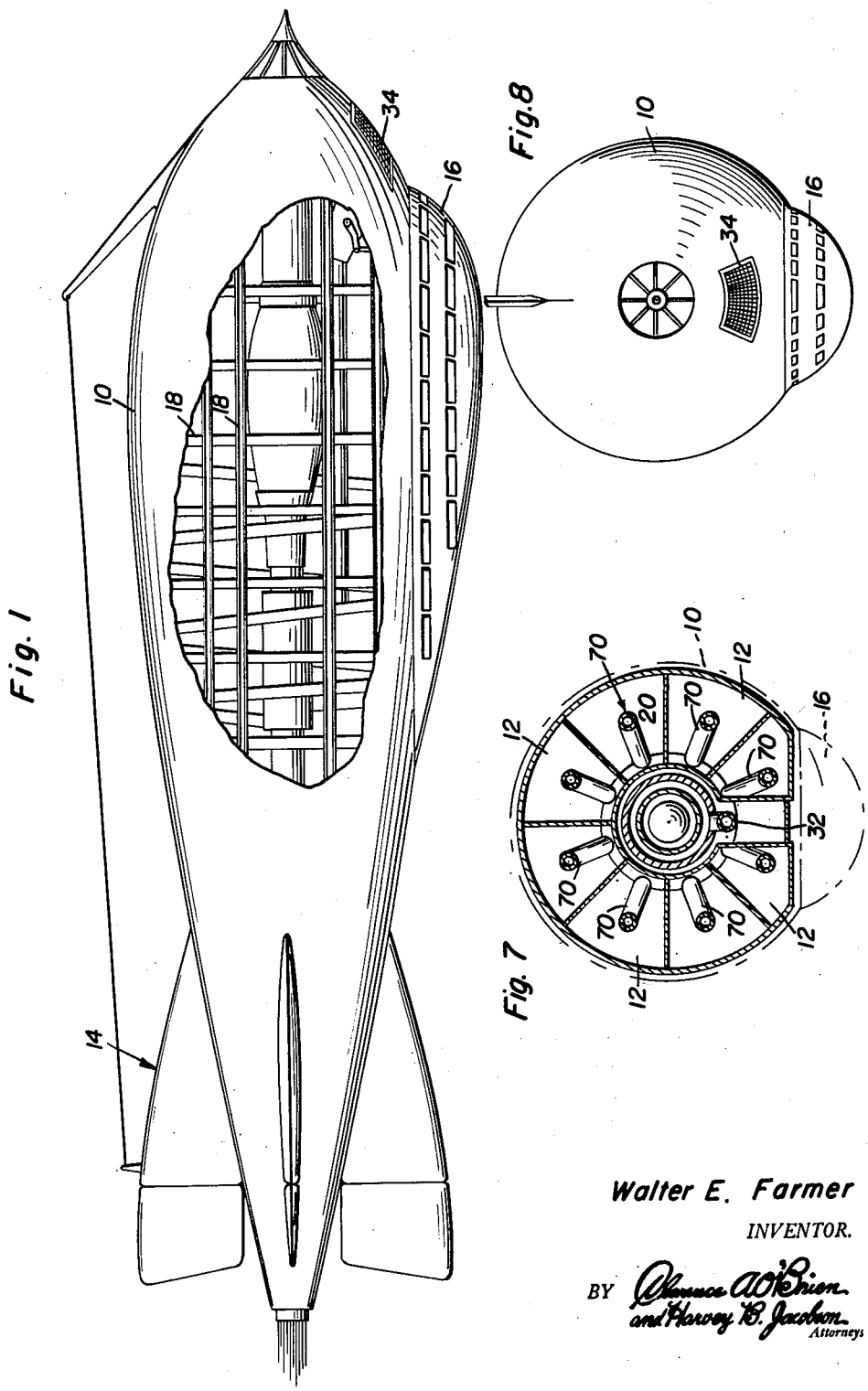
Walter E. Farmer
INVENTOR.

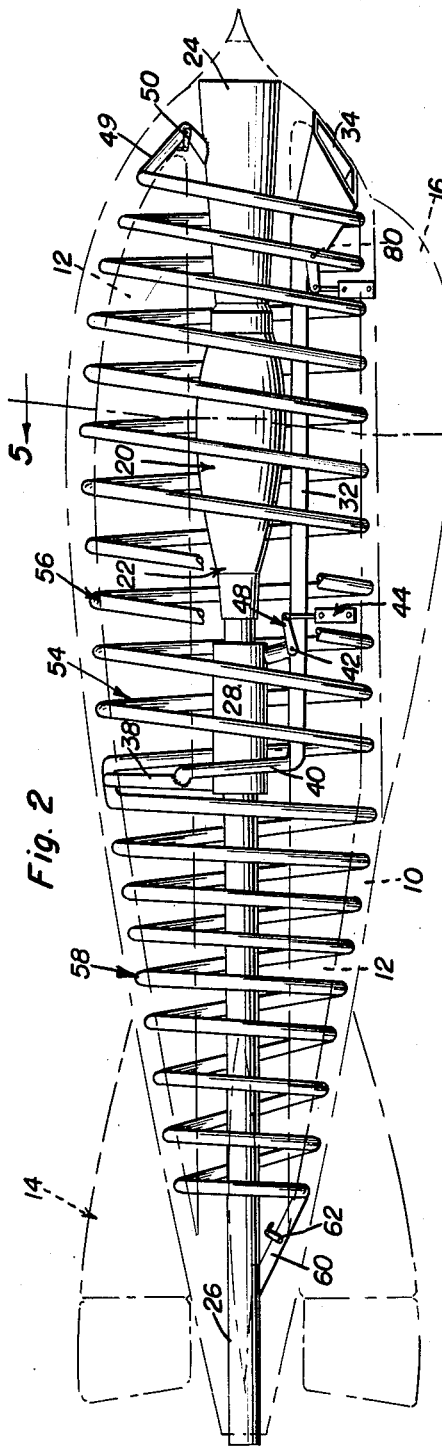
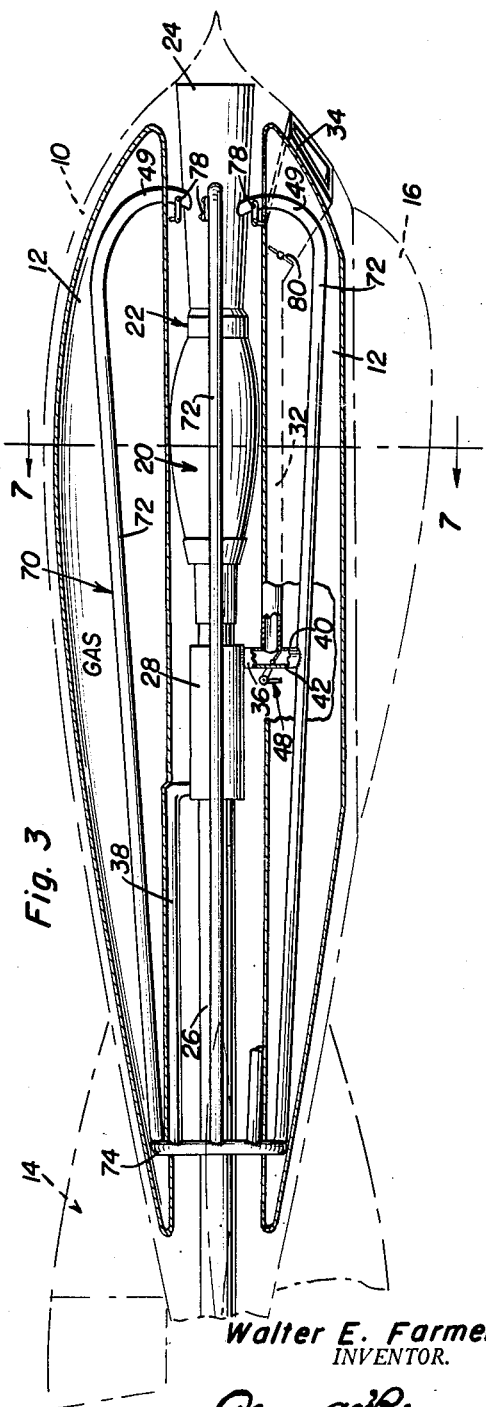

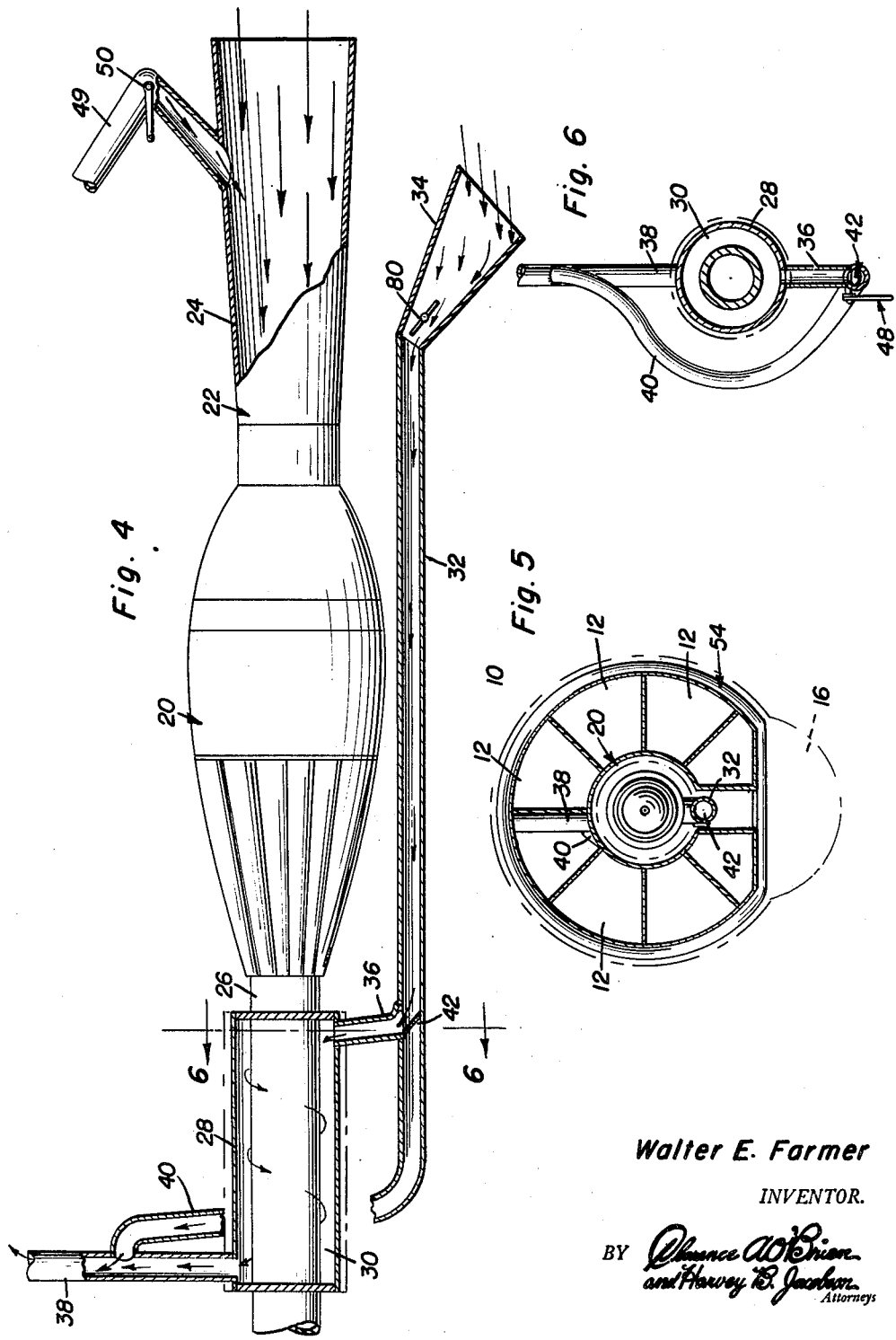

Patented June 3, 1952

2,599,241

UNITED STATES PATENT OFFICE 2,599,241

LIGHTER THAN AIR AIRCRAFT WITH HEATING MEANS FOR THE GAS BAGS THEREOF

Walter E. Farmer, Corsicana, Tex.

Application July 11, 1950, Serial No. 173,104

4 Claims. (Cl. 244—97)

This invention relates to improvements in aircraft of the type classified as lighter than air.

An object of this invention is to employ some of the heat connected with the operation of an engine for the purpose of expanding the gas in the gas bag of a lighter than air craft to thereby increase the effective volumetric displacement of the gas bag while the engine is in operation and to provide a means for introducing cool air in proximity to the gas in the gas bag for causing the gas to contract, these functions being controlled in accordance with the perogative of the pilot of the craft. By virtue of this arrangement the use of ballast or the exhausting of gas may be entirely obviated in a lighter than air craft.

Ancillary objects and features of importance will become apparent in following the description of the illustrated forms of the invention.

In the drawings:

Figure 1 is an elevational view of the device, portions being broken away to illustrate internal details;

Figure 2 is an elevational view of the device, the structural members and hull of the craft being shown in phantom;

Figure 3 is a longitudinal sectional view of portions of a typical aircraft of this type, portions being shown in phantom and this figure illustrating a second form of the invention;

Figure 4 is a schematic view, portions being shown in section and portions in elevation showing some of the common subject matter of the embodiments of Figures 2 and 3;

Figure 5 is a transverse sectional view taken substantially on the line 5—5 of Figure 2 and in the direction of the arrows;

Figure 6 is a sectional view taken substantially on the line 6—6 of Figure 4 and in the direction of the arrows;

Figure 7 is a transverse sectional view taken substantially on the line 7—7 of Figure 3 and in the direction of the arrows; and Figure 8 is a front view of the device in Figure 1.

In carrying out this invention there is provided in a typical aircraft 10 of the lighter than air type, a means of transferring some of the heat generated by the engine of the aircraft for expanding the gas in the gas bag or bags 12. As conventional structure there is an empennage generally indicated at 14 and a cabin 16 located at the bottom of the hull, the hull covering being disposed on suitable framing members 18.

Attention is first invited to Figure 4. Here there is a typical engine 20 which is of the jet propulsion type and which includes an engine tube 22. The front section 24 of the engine tube extends forwardly of the jet engine 20, while the rear section 26 including a tail cone extends from the opposite end of the engine 20. A housing 28 defining a heating chamber 30 is concentrically arranged with the rear section 26 of the tube 22. There is an air duct 32 having a flared forward end 34 opening forwardly of the aircraft for increase of dynamic pressure while the aircraft is in forward flight. The air duct is connected to one end of the housing 26 by means of a conduit 36 and is connected to a pipe or conduit 38 by means of a by-pass conduit 40. To complete the by-pass assembly there is a valve 42 disposed in the duct 32 at the point where it merges with the part thereof considered the by-pass line in order to selectively control the direction of movement of the air through the air duct that is, to determine whether the air is to flow through the chamber 30 and into the line 38 or to determine whether the air is to pass directly into the by-pass 40 by circumventing the chamber 30. Any suitable means may be employed for operating the valve 42, for example the hydraulic cylinder-piston assembly 44 through the linkage 48. Suitable controls and means of applying fluid under pressure to the cylinder-piston assembly are supplied, these being purely conventional in nature.

A return line 49 opens into the front section 24 of the tube 22 and has a control valve 50 therein at a convenient location in order to open and close the return line. This valve, as are all of the valves, is operated by conventional control means, either manual or through the assistance of hydraulic or electrical forces.

Reference is now made to Figures 2 and 3. The previously described structure is common to both of the illustrated embodiments. In Figure 2 the heat exchanger 54 consists of a number of connected coils, there being a front section 56 and a rear section 58. For the rear section there is a return line 60 feeding into the tail cone section 26 of the tube 22 and a valve 62 therefor. For the front section 56 there is the described return line 48 with its valve 50 therein.

In the embodiment of Figure 2 the coils are adapted to be disposed around the gas bags 12 and on the exterior thereof, whereby the heated air passing through the heat exchanger 54 causes the gas in the gas bags 12 to expand due to the proximity of the coils to the gas in the bags.

With respect to Figure 3 the heat exchanger 70 consists of a number of substantially horizontal tubes 12 which are disposed in the actual gas bags 12 so that the heat in the tubes is transferred to the gas of the bags by proximity to the gas. In this instance the heated air passes into the line 38 whence it enters the heat exchanger through the manifold 74 thereof, this manifold being disposed at the rear of the craft and having each of the tubes 72 connected thereto. The tubes 72 extend forwardly of the craft and open into the front section 24 of the tube 22 individually. Valves 78 are employed for controlling the passage of air into the front section of the tube 22, there being one valve provided for each tube. Each of these valves is connected by means of cables or a ring or the like for operation so that the operation may be simultaneous.

In operation of the device cool air enters the air scoop 34 and passes through the duct 32. The valve 80 disposed in or adjacent the scoop 34 is used for the purpose of rendering the entire system operative or inoperative. The air passing through the duct 32 enters either the chamber 30 through the conduit 36 or enters directly into the heat exchanger 70 by means of the by-pass line 40. If the air is caused to enter the chamber 30 by a predetermined setting of the valve 42, it is heated in the chamber and flows into the heat exchanger. Then by circulating adjacent the gas in the gas bags this gas is caused to expand. The heated air being placed under a considerable dynamic pressure flows freely through the heat exchanger until it enters the forward part or section of the tube 22. When this air is heated, it will be noted that the air passing into the intake section 24 of the tube 22 is preheated inasmuch as all of the heat will not be extracted therefrom in passing through the gas bags, this lending to more efficient engine 20 operation. Therefore, not only is the gas in the gas bags 12 expanded by using the device but also, more efficient engine operation is realized. In the instance of Figure 1, the heated air will flow from the rear of the craft to the front due to the nature and construction of the heat exchanger 70. In the instance of Figure 2, a portion of the heated air will flow rearwardly for deposit in the tail cone portion of the jet engine, this heated air being wasted after having served its purpose of expanding the gas in the bags 12. But, the front section 56 of the heat exchanger 54 opens into the front part of the tube 22 so that this air is passed through the engine for supporting combustion within that engine. Moreover, the air passing through the air inlet section 24 of the tube 22 causes a suction at the point of entry of the return line 49 with the tube 22.

It is recommended that the device be employed as outlined above when the craft is to climb or sustain a position above the surface of the earth. When it is desired to descend, by manipulation of the valve 42 the air entering the scoop 34 is by-passed through the line 40 directly into the heat exchanger 54 or 70 so that the heat exchanger now serves the purpose of extracting heat from the gas in the bags 12 thereby decreasing the density of the gas and accordingly decreasing the volumetric displacement of the gas bags 12. This will aid in descent of the craft.

By employing the above described construction not only may a jet propulsion system be adapted for efficient use with a lighter than air craft of the dirigible type, but it may also be put to practical use for heat utility which would ordinarily or otherwise be wasted. The axial arrangement of the tube 22 is of importance due to the facility of extending heat exchangers into the desired parts of the craft.

Having described the invention, what is claimed as new is:

1. In an aircraft which includes a longitudinal axis, a jet engine tube axially arranged in the aircraft, a gas bag disposed adjacent said tube, and means connected to said tube to direct heated fluid from near the tube into close proximity to the gas in said bag to heat the gas in the bag from heat of the tube, a cool air duct operatively connected with said means, and a control assembly to render said duct operative to cool the gas in the bag, and said control assembly comprising a by-pass connected with said duct at one end and connected at the other end to said means, and a valve to direct air from said duct selectively into said chamber and directly into a heat exchanger which forms a part of said means.

2. In an aircraft which has a gas bag, an engine tube having a housing thereon forming a heating chamber, an air duct connected to said heating chamber, and a heat exchanger operatively connected with said chamber and located for heat exchange to the gas of said gas bag, a by-pass secured to said tube and to said heat exchanger to conduct air from the duct directly to said heat exchanger, and means operatively connected with said by-pass for selectively directing the air into said by-pass and into said heat exchanger.

3. The combination of claim 2, and said heat exchanger comprising a coil concentrically arranged with respect to said engine tube, and one end of said coil communicating with the forward end portion of said engine tube.

4. The combination of claim 2, and said heat exchanger comprising a plurality of longitudinal tubes, at least some of which being communicated with the front end of said engine tube.

WALTER E. FARMER.

REFERENCES CITED

The following references are of record in the file of this patent:

UNITED STATES PATENTS

| Number | Name | Date |
|---|---|---|
| 1,598,002 | Parker | Aug. 31, 1926 |
| 1,629,843 | Silver | May 24, 1927 |
| 1,653,849 | Hall | Dec. 27, 1927 |
| 1,729,020 | Szymanski | Sept. 24, 1929 |
| 1,835,260 | Barrera | Dec. 8, 1931 |

FOREIGN PATENTS

| Number | Country | Date |
|---|---|---|
| 262,089 | Great Britain | Aug. 18, 1927 |